United States Patent
Dai et al.

(10) Patent No.: US 10,017,391 B2
(45) Date of Patent: Jul. 10, 2018

(54) DIRECT POLYMER TEMPLATING SYNTHESIS OF MESOPOROUS CARBON

(71) Applicants: UT-Battelle, LLC, Oak Ridge, TN (US); University of Tennessee Research Foundation, Knoxville, TN (US)

(72) Inventors: Sheng Dai, Knoxville, TN (US); Kimberly M. Nelson, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 15/132,347

(22) Filed: Apr. 19, 2016

(65) Prior Publication Data

US 2016/0311690 A1    Oct. 27, 2016

Related U.S. Application Data

(60) Provisional application No. 62/151,504, filed on Apr. 23, 2015.

(51) Int. Cl.
| | | |
|---|---|---|
| C01B 31/02 | (2006.01) | |
| C01B 31/12 | (2006.01) | |
| C01B 32/00 | (2017.01) | |
| C01B 32/30 | (2017.01) | |

(52) U.S. Cl.
CPC ............. *C01B 31/12* (2013.01); *C01B 32/00* (2017.08); *C01B 32/30* (2017.08)

(58) Field of Classification Search
CPC ...................................... C01B 32/00
See application file for complete search history.

(56) References Cited

U.S. PATENT DOCUMENTS

| | | | | |
|---|---|---|---|---|
| 4,912,069 A | * | 3/1990 | Ruben ................. | C04B 33/13 501/148 |
| 6,024,899 A | * | 2/2000 | Peng ................... | C01B 31/02 264/129 |
| 6,737,445 B2 | * | 5/2004 | Bell .................... | B01J 20/20 264/29.1 |
| 8,591,855 B2 | * | 11/2013 | Tenninson ........... | B01J 21/18 264/105 |
| 8,658,120 B2 | * | 2/2014 | Yoshinaga ........... | B01J 20/20 423/445 R |

* cited by examiner

*Primary Examiner* — Stuart Hendrickson
(74) *Attorney, Agent, or Firm* — Edna I. Gergel

(57) ABSTRACT

The invention is directed to a method for fabricating a mesoporous carbon composite material. The method comprises providing a precursor composition and subjecting the precursor material to a curing step followed by carbonization step. The precursor composition comprises (i) a templating component comprised of a linear homopolymer material, (ii) a phenolic compound or material, (iii) a cross-linkable aldehyde component, and (iv) an acid catalyst.

4 Claims, 4 Drawing Sheets

DIRECT POLYMER TEMPLATING SYNTHESIS OF MESOPOROUS CARBON

RELATED APPLICATIONS

This application asserts the priority of U.S. Provisional Application Ser. No. 62/151,504 filed on Apr. 23, 2015, the contents of which are incorporated herein by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE INVENTION

The invention relates to the field of mesoporous carbon. In particular, the invention relates to the synthesis of mesoporous carbon via spinodal decomposition.

BACKGROUND OF THE INVENTION

Traditional porous carbon materials are derived from coal, wood, biomass, or polymers. These carbons are typically microporous, and are formed from defects caused by heteroatoms eliminated during carbonization. Microporous carbons are often inadequate in terms of conductivity, mass transport, and structural integrity due to the remaining heteroatoms, restricted flow pathways, and lack of structural control. These deficiencies can be resolved by the introduction of mesoporosity, which make them ideal for catalysis, batteries, supercapacitors, and adsorbents. Mesoporous carbons that can be tailored to optimize these applications are in high demand.

The standard templating synthesis utilizes methods that can be both costly and hazardous on the industrial scale. For instance, hard-templating of mesoporous carbon involves using a sacrificial silica template in combination with a carbon precursor, in which the template is etched after carbonization with harsh acids or bases (i.e. HF, NaOH) and a carbon inverse replica is revealed. Soft-templating synthesis tends to be less severe and is based on a self-assembly approach using block copolymer templating agents, which are removed via carbonization. The block copolymer agents can be synthetically intensive to produce, which makes it very costly. While both of these methods produce well-defined mesopore size distributions and morphologies, they lack a facile route for mesopore development and a cost effective porogen that is relinquished by the process for industrial scale viability.

SUMMARY OF THE INVENTION

These and other objectives have been met by the present invention, which provides, in one aspect, a surfactant-free method of preparing mesoporous carbon through the in-situ polymerization of phloroglucinol-formaldehyde (PF) resins in the presence of a templating component, such as polyethylene glycol (PEG), under reflux in acidic ethanol. The essence of the method of the present invention synthesizes mesoporous carbons through spinodal decomposition instead of traditional micellar self-assembly approaches. The nonsurfactant-based templates, such as PEG, are considerably less costly and can be derived from renewable resources.

DETAILED DESCRIPTION OF THE INVENTION

Figure 1A:
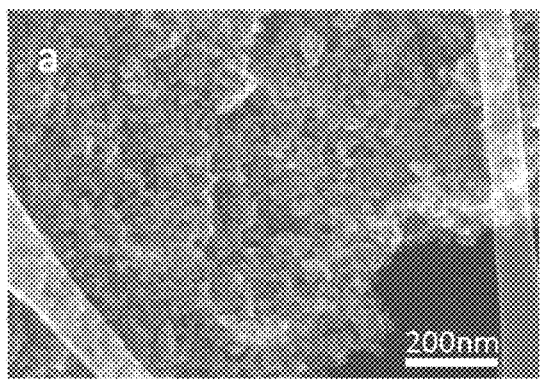
FIG. 1A. SEM image of mesoporous carbon from prepared PF-PEG (14 k MW) precursor.

In one aspect, the invention is directed to a method for fabricating a mesoporous carbon composite material. As used herein and as understood in the art, the term "mesoporous" indicates a material containing "mesopores", which are pores having a diameter (i.e., pore size) of between 2 and 50 nm. In contrast to mesopores, micropores (and thus, microporous materials) are generally understood to have pore diameters of less than 2 nm, whereas macropores (and thus, macroporous materials) are generally understood to have pore diameters greater than 50 nm.

The method first involves providing (i.e., preparing or otherwise obtaining in prepared form) a precursor composition which will be subjected to a curing step followed by a carbonization step in order to produce a mesoporous carbon material of the invention. The precursor composition includes at least the following components: (i) a templating component comprised of a linear homopolymer material, such as polyethylene glycol or polyethylene oxide, (ii) a phenolic compound or material, (iii) a crosslinkable aldehyde component, and (iv) an acid catalyst. The combination of phenolic compound/material and the crosslinkable aldehyde are herein referred to as the "polymer precursor" or "polymer precursor components". The resulting polymer (i.e., after polymerization and crosslinking) functions as the carbonization precursor, i.e., the source of carbon upon being carbonized. In contrast, the templating component (i.e., polymer) functions to organize the polymer precursor materials in an ordered (i.e., patterned) arrangement before the carbonization step. During carbonization, the polymer is typically completely volatized into gaseous byproducts, and thereby, generally does not contribute to formation of solid carbon. However, decomposition of the polymer into volatile gases serves the important role of creating the mesopores in the carbon structure during the carbonization step.

The polymer material can be any linear homopolymer that can function as a templating component. As used herein, the tem "linear homopolymer" refers to any long chain polymer which contains a single type of monomer for polymerization and lacks branching or cross-linking chains. Suitable linear homopolymer materials include, but are not limited to, polyethylene glycol, polyethylene oxide, etc. The polymer can have any molecular weight. For example, the molecular weight may be precisely, about, or at least, for example, 2,000; 3,000; 4,000; 5,000; 10,000; 20,000; 50,000; 75,000; 100,000; 110,000; 125,000; 150,000; 175,000; or 200,000 Da, or within a range bounded by any two of these values.

The phenolic compound or material of the precursor composition can be any phenolic compound or material that can react by a condensation reaction with an aldehydic compound or material (e.g., formaldehyde) under acidic conditions. Typically, any compound or material containing a hydroxy group bound to an aromatic ring (typically, a phenyl ring) is suitable for the present invention as a phenolic compound or material.

In one embodiment, the phenolic compound or material contains one phenol group (i.e., one hydroxy group bound to a six-membered aromatic ring). Some examples of such compounds include phenol, the halophenols, the aminophenols, the hydrocarbyl-substituted phenols (wherein "hydrocarbyl" includes, e.g., straight-chained, branched, or cyclic alkyl, alkenyl, or alkynyl groups typically containing from 1 to 6 carbon atoms, optionally substituted with one or more oxygen or nitrogen atoms), naphthols, nitrophenols, hydroxyanisoles, hydroxybenzoic acids, fatty acid ester-substituted or polyalkyleneoxy-substituted phenols (e.g., on the 2 or 4 positions with respect to the hydroxy group), phenols containing an azo linkage (e.g., p-hydroxyazobenzene), and phenolsulfonic acids (e.g., p-phenolsulfonic acid). Some general subclasses of halophenols include the fluorophenols, chlorophenols, bromophenols, and iodophenols, and their further sub-classification as, for example, p-halophenols (e.g., 4-fluorophenol, 4-chlorophenol, 4-bromophenol, and 4-iodophenol), m-halophenols (e.g., 3-fluorophenol, 3-chlorophenol, 3-bromophenol, and 3-iodophenol), o-halophenols (e.g., 2-fluorophenol, 2-chlorophenol, 2-bromophenol, and 2-iodophenol), dihalophenols (e.g., 3,5-dichlorophenol and 3,5-dibromophenol), and trihalophenols (e.g., 3,4,5-trichlorophenol, 3,4,5-tribromophenol, 3,4,5-trifluorophenol, 3,5,6-trichlorophenol, and 2,3,5-tribromophenol). Some examples of aminophenols include 2-, 3-, and 4-aminophenol, and 3,5- and 2,5-diaminophenol. Some examples of nitrophenols include 2-, 3-, and 4-nitrophenol, and 2,5- and 3,5-dinitrophenol. Some examples of hydrocarbyl-substituted phenols include the cresols, i.e., methylphenols or hydroxytolenes (e.g., o-cresol, m-cresol, p-cresol), the xylenols (e.g., 3,5-, 2,5-, 2,3-, and 3,4-dimethylphenol), the ethylphenols (e.g., 2-, 3-, and 4-ethylphenol, and 3,5- and 2,5-diethylphenol), n-propylphenols (e.g., 4-n-propylphenol), isopropylphenols (e.g., 4-isopropylphenol), butylphenols (e.g., 4-n-butylphenol, 4-isobutylphenol, 4-t-butylphenol, 3,5-di-t-butylphenol, 2,5-di-t-butylphenol), hexylphenols, octyl phenols (e.g., 4-n-octylphenol), nonylphenols (e.g., 4-n-nonylphenol), phenylphenols (e.g., 2-phenylphenol, 3-phenylphenol, and 4-phenylphenol), and hydroxycinnamic acid (p-coumaric acid). Some examples of hydroxyanisoles include 2-methoxyphenol, 3-methoxyphenol, 4-methoxyphenol, 3-t-butyl-4-hydroxyanisole (e.g., BHA), and ferulic acid. Some examples of hydroxybenzoic acids include 2-hydroxybenzoic acid (salicylic acid), 3-hydroxybenzoic acid, 4-hydroxybenzoic acid, and their organic acid esters (e.g., methyl salicylate and ethyl-4-hydroxybenzoate).

In another embodiment, the phenolic compound or material contains two phenol groups, Some examples of such compounds include catechol, resorcinol, hydroquinone, the hydro carbyl-linked bhs-phenols (e.g., his-phenol A, methylenebisphenol, and 4,4'-dihydroxystilbene), 4,4'-biphenol, the halo-substituted diphenols (e.g., 2-haloresorcinols, 3-haloresorcinols, and 4-haloresorcinols, wherein the halo group can be fluoro, chloro, bromo, or iodo), the amino-substituted diphenols (e.g., 2-aminoresorcinol, 3-aminoresorcinol, and 4-aminoresorcinol), the hydrocarbyl-substituted diphenols (e.g., 2,6-dihydroxytoluene, i.e., 2-methylresorcinol; 2,3-, 2,4-, 2,5-, and 3,5-dihydroxytoluene, 1-ethyl-2,6-dihydroxybenzene, caffeic acid, and chlorogenic acid), the nitro-substituted diphenols (e.g., 2- and 4-nitroresorcinol), dihydroxyanisoles (e.g., 3,5-, 2,3-, 2,5-, and 2,6-dihydroxyanisole, and vanillin), dihydroxybenzoic acids (e.g., 3,5-, 2,3-, 2,5-, and 2,6-dihydroxybenzoic acid, and their alkyl esters, and vanillic acid), and phenolphthalein.

In another embodiment, the phenolic compound or material contains three phenol groups. Some examples of such compounds include phloroglucinol (1,3,5-trihydroxybenzene), pyrogallol (1,2,3-trihydroxybenzene), 1,2,4-trihydroxybenzene, 5-chloro-1,2,4-trihydroxybenzene, resveratrol (trans-3,5,4'-trihydroxystilbene), the hydrocarbyl-substituted triphenols (e.g., 2,4,6-trihydroxytoluene, i.e., methylphloroglucinol, and 3,4,S-trihydroxytoluene), the halogen-substituted triphenols (e.g., 5-chloro-1,2,4-trihydroxybenzene), the carboxy-substituted triphenols (e.g., 3,4,5-trihydroxybenzoic acid, i.e., gallic acid or quinic acid, and 2,4,6-trihydroxybenzoic acid), the nitro-substituted triphenols (e.g., 2,4,6-trihydroxynitrobenzene), and phenol-formaldehyde resoles or novolak resins containing three phenol groups.

In yet another embodiment, the phenolic compound or material contains multiple (i.e., greater than three) phenol groups. Some examples of such compounds or materials include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups), quercetin, ellagic acid, and tetraphenol ethane.

The crosslinkable aldehyde component can be any organic compound or material containing an aldehyde group. Typically, the crosslinkable aldehyde is formaldehyde. However, there are also numerous organoaldehydes, organodialdehydes, and polyaldehydes (e.g., organotrialdehydes, organotetraaldehydes, and so on) considered herein which can serve the same purpose. The organoaldehydes can be generally represented by the following formula (Formula I):

R—CHO  (I)

wherein R can represent a straight-chained, branched, or cyclic, and either saturated or unsaturated hydrocarbyl group, typically containing at least 1, 2, or 3 carbon atoms, and up to 4, 5, 6, 7, or 8 carbon atoms. Some examples of suitable organoaldehydes include acetaldehyde, propanal (propionaldehyde), butanal(butyraldehyde), pentanal(valeraldehyde), hexanal, crotonaldehyde, acrolein, benzaldehyde, and furfural.

The organodialdehydes can be generally represented by the following formula (Formula II):

OHC—R—CHO  (II)

wherein R is a straight-chained, branched, or cyclic, and either saturated or unsaturated, hydrocarbyl linking group, typically containing at least 1, 2, or 3 carbon atoms, and up to 4, 5, 6, 7, 8, 9, or 10 carbon atoms. Some examples of dialdehyde compounds include glyoxal (where R is a bond), malondialdehyde (where R is methylene), succinaldehyde, glutaraldehyde, adipaldehyde, pimelaldehyde, suberaldehyde, sebacaldehyde, cyclopentanedialdehyde, terephthaldehyde, and furfuraldehyde. In some embodiments, any one or more classes of specific types of aldehyde compounds or materials described above are excluded from the preparative method described herein.

The acid catalyst component in the precursor composition can be any acid strong enough to accelerate the reaction between phenolic and aldehyde compounds. In some embodiments, the acid is a weak acid, such as a weak organic acid (e.g., acetic acid, propionic acid, or citric acid) or a weak inorganic acid (e.g., phosphoric acid). In other embodiments, the acid is a strong acid, such as a mineral acid, such as hydrochloric acid, hydrobromic acid, hydroiodic acid, sulfuric acid, or a superacid, such as triflic acid. Depending on the type of acid and other conditions, the molar concentration of acid (per total precursor composition) can be, for example, precisely, about, at least, less than, or up to 0.1 molar (i.e., 0.1M), 0.2 M, 0.5 M, 1.0 M, 1.5 M, 2.0 M, 2.5 M, 3.0 M, 3.5 M, 4.0 M, 4.5 M, 5.0M, or an acid concentration within a range bounded by any two of the foregoing values. The molar concentration values given may also be referred to in terms of molar equivalents of $H^+$, or pH, wherein the pH for a strong acid generally abides by the formula pH=−log [$H^+$], wherein [$H^+$] represents the concentration of $H^+$ ions. In some embodiments, any one or more classes or specific types of acids described above are excluded from the preparative method described herein. In a particular embodiment, a weak acid (i.e., having a pKa above −2), such as the weak organic acids (e.g., p-toluenesulfonic acid) or weak inorganic acids (e.g., phosphoric or hypophosphorous acid), are excluded from the precursor composition.

Any one or more of the above components or final product can be dissolved, dispersed, or otherwise in contact with a liquid, which can be a suitable solvent. The solvent can be, for example, an organic polar protic or non-protic solvent. Some examples of organic polar protic solvents include alcohols, e.g., methanol, ethanol, n-propanol, isopropanol, ethylene glycol, and the like. Some examples of organic polar non-protic solvents include acetonitrile, dimethylformamide, dimethylsulfoxide, methylene chloride, organoethers (e.g., tetrahydrofuran or diethylether), and the like.

The liquid or solvent can also be an ionic liquid, such as an imidazolium or piperidinium ionic liquid. The liquid or solvent can be used in the processing of components to make the final product (and generally, eventually removed), or included with the product as a component of the final product or an intermediate thereof. In some embodiments, any one or more of the above classes or specific types of liquids can be excluded from a portion or the entire preparative process described above, or from the final product.

In some embodiments, the molar amount of crosslinkable aldehyde component is higher than the molar amount of phenolic component (i.e., molar ratio of aldehyde to phenolic components is greater than 1). In such embodiments, the molar ratio of aldehyde to phenolic components may be precisely, about, or at least, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0, or within a range bounded by any two of these values. In other embodiments, the molar amount of aldehyde component is less than the molar amount of phenolic component (i.e., molar ratio of aldehyde to phenolic components is less than 1). In such embodiments, the molar ratio of aldehyde to phenolic components may be precisely, about, or less than, for example, 0.9, 0.8, 0.7, 0.6, 0.5, 0.4, 0.3, or 0.2, or within a range bounded by any two of these values.

In other embodiments, the molar amount of aldehyde component is about the same as the molar amount of phenolic component, i.e., a ratio of about 1.

After the components of the precursor composition are all combined, the combined mixed components are generally subjected to a curing step to convert the mixture to a crosslinked gel or solid material. The curing step includes any of the conditions, as known in the art, that promote polymerization, and preferably, crosslinking, of polymer precursors, and in particular, crosslinking between phenolic and aldehydic components to form a solid crosslinked carbon precursor. The curing conditions generally include application of an elevated temperature for a specified period of time without significant carbonization (or any carbonization) of the precursor. Other curing conditions and methods can be used in the curing step, including radiative (e.g., UV curing) or purely chemical (i.e., without use of an elevated temperature). Preferably, the curing step involves subjecting the polymer precursors or the entire precursor composition to a temperature of about, at least, up to, or less than 60, 70, 80, 90, 100, 110, 120, 130, 140° C., 150° C., 160° C., 170° C., 180° C., 190° C., or 200° C. for a time period of, typically, at least 0.5, 1, 2, 5, 10, or 12 hours and up to 15, 20, 24, 36, 48, or 72 hours, wherein it is understood that higher temperatures generally require shorter time periods. Alternatively, the curing temperature is within a range bounded by any two of the exemplary curing temperatures recited above.

In particular embodiments, it may be preferred to subject the precursors to an initial lower temperature curing step followed by a higher temperature curing step. The initial curing step may employ a temperature of about, for example, 60, 70, 80, 90, or 100° C. (or a range between any of these), while the subsequent curing step may employ a temperature of about, for example, 90, 100, 110, 120, 130, 140° C., 150° C., 160° C., 170° C., 180° C., 190° C., or 200° C. (or a range between any of these), provided that the temperature of the initial curing step is less than the temperature of the subsequent curing step. In addition, each curing step can employ any of the exemplary time periods given above.

Alternatively, it may be preferred to gradually increase the temperature during the curing step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, or 30° C./min, or any suitable range between any of these values. The gradual temperature increase can also include one or more periods of residency at a particular temperature, and/or a change in the rate of temperature increase.

The carbonization step includes any of the conditions, as known in the art, which cause carbonization of the precursor composition, and which is no more than or less than 2000° C. In different embodiments, a carbonization temperature of about, at least, up to, or less than 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., 1800° C., 1900° C., or 2000° C. (or a temperature within a range therein) is employed for a time period of, typically, at least 1, 2, 3, 4, 5, or 6 hours and up to 7, 8, 9, 10, 11, or 12 hours, wherein it is understood that higher temperatures generally require shorter time periods to achieve the same result. Alternatively, the carbonization temperature may be selected from a range bounded by any two exemplary carbonization temperatures recited above.

In particular embodiments, it may be preferred to subject the precursors to an initial lower temperature carbonization step followed by a higher temperature carbonization step. The initial carbonization step may employ a temperature of about, for example, 300, 350, 400, 450, 500, 550, 600, 650, 700, 750, 800, 850, or 900° C. (or a range between any of these), while the subsequent carbonization step may employ a temperature of about, for example, 500, 550, 600, 650, 700, 750, 800, 850, 900, 950, 1000, 1050, 1100, 1200, 1250, 1300, 1400, 1450, 1500, 1600, 1700, 1900° C., or 2000° C. (or a range between any of these), provided that the temperature of the initial carbonization step is less than the temperature of the subsequent carbonization step. In addition, each carbonization step can employ any of the exemplary time periods given above.

Alternatively, it may be preferred to gradually increase the temperature during the carbonization step between any of the carbonization temperatures given above, or between room temperature (e.g., 15, 20, 25, 30, or 35° C.) or any of the curing temperatures provided above and any of the carbonization temperatures given above. Thus, in some embodiments, a curing step and carbonization step may be performed continuously, one after the other, with no clear boundary between the steps. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase.

In some embodiments, after combining the components of the precursor composition, and before curing or carbonization, the solution is stirred for a sufficient period of time (e.g., at least or about 1, 2, 5, 10, 20, 30, 40, 50, 60, 90, or 120 minutes, or a range between any of these values) until a phase separation or precipitation is evident. In some cases, the solution turns turbid. The turbidity generally indicates formation of an ordered nanocomposite gel or solid which has undergone a degree of phase separation from the liquid portion of the solution. If desired, stirring can be continued after the onset of turbidity, such that the total amount of stirring time before curing, carbonization, or a phase-separation process is any of the exemplary time periods given above, or a much longer period of time, such as several hours (e.g., at least or about 4, 5, 6, 7, 8, 10, or 12 hours) or days (e.g., at least or about 1, 2, 3, 4, 5, 10, 15, or 20 days), or a range between of the foregoing exemplary periods of time.

After turbidity becomes evident, the phase-separated mixture can be subjected to conditions that cause the polymerized precursor material to be isolated from the liquid portion. Any separation method can be applied herein. In a preferred embodiment, the phases are separated by centrifugation. In different embodiments, the centrifugation can be conducted at an angular speed of or at least, for example, 2000 rpm, 2500 rpm, 3000 rpm, 4000 rpm, 5000 rpm, 6000 rpm, 7000 rpm, 8000 rpm, 9000 rpm, 9500 rpm, 10000 rpm, 11000 rpm, 12000 rpm, or 15000 rpm, or a range between any of these values, for a period of time of, for example, 0.1, 0.2, 0.5, 1, 2, 3, 4, 5, 10, or 15 minutes, wherein it is understood that higher angular speeds generally require less amounts of time to effect an equivalent degree of separation. Superspeed centrifugation (e.g., up to 20,000 or 30,000 rpm) or ultracentrifugation (e.g., up to 40,000, 50,000, 60,000, or 70,000 rpm) can also be used. The gel or solid phase, once separated from the liquid phase, is preferably cured and carbonized in the substantial absence of the liquid phase according to any of the conditions described above for these processes.

The produced mesoporous carbon material contains mesopores, i.e., pores having a diameter (i.e., pore size) of 2 to 50 nm. Preferably, the carbon material possesses the mesopores in the substantial absence of micropores (pores of less than 2 nm). By a "substantial absence" of micropores is meant that no more than 50%, and more preferably, no more than about 25%, 15%, or 10% of the total pore volume is due to the presence of micropores. In different embodiments, the carbon material preferably possesses mesopores having a size (diameter) of about 2, 3, 4, 5, 6, 7, 8, 9, 10, 12, 15, 20, 25, 30, 35, 40, 45, or 50 nm, or a range between any two of these values. The pores of the carbon material can also possess a level of size uniformity, i.e., in pore diameters and/or pore shape. For example, in different embodiments, the pores of the carbon material may possess an average pore diameter corresponding to any of the diameters exemplified above, subject to a degree of variation of no more than, for example, ±10 nm, ±8 nm, ±6, nm, ±5 nm, ±4 nm, ±3 nm, ±2 nm, or ±1 nm. The wall thickness of the mesopores is typically within the range of about 5.0-7.0 nm, e.g., 5.0, 5.5, 6.0, 6.5, or 7.0 nm, or a range between any two of these values.

The mesoporous carbon material typically possesses a BET surface area of about or at least 50, 100, 200, 300, 400, 450, 500, 550, 600, 650, 700, 750, or 800 m$^2$/g, or a range between any two of these values. The mesoporous carbon material typically possesses a pore volume of about or at least 0.2, 0.25, 0.3, 0.35, 0.4, 0.45, 0.5, 0.55, 0.6, 0.65, or 0.7 cm$^3$/g, or a range between any two of these values.

The mesoporous carbon material produced according to the method described above preferably possesses an improved physical resilience, such as an improved thermal stability and resistance to cracking. An improved thermal stability is preferably evidenced by a substantial absence of structural shrinkage, and/or a substantial preservation of mesoporosity, and/or a substantial preservation of the BET surface area after being heat-treated at a temperature of at least 1800° C. In more preferred embodiments, the improved thermal stability is evidenced after heat treating the mesoporous carbon material at a temperature of at least 1850° C., 1900° C., 1950° C., 2000° C., 2050° C., 2100° C., 2150° C., 2200° C., 2250° C., 2300° C., 2350° C., 2400° C., 2450° C., 2500° C., 2550° C., 2600° C., 2650° C., or 2700° C., or a range between any two of the foregoing values. A "substantial absence of structural shrinkage" and a "substantial preservation of BET surface area" as used herein generally means that either of these parameters change by no more than about 5%, and more preferably, no more than about 1%, 0.5%, or 0.1% after heat treatment as compared to the original value before heat treatment. A "substantial preservation of mesoporosity" as used herein generally means that the pore volume due to micropores or macropores does not increase by more than about 5%, and more preferably, no more than about 1%, 0.5%, or 0.1%, as compared to the total pore volume.

In another aspect, the invention is directed to an electrode-containing device that includes the mesoporous carbon composite, described hereinabove, on or in at least one of the electrodes of the device. For example, a capacitive deionization (CDI) device can include the mesoporous carbon composite in one or two electrodes of the CDI device. The invention is also directed to a method for desalinating water by electrically operating the CDI device. The invention is also directed to a method of energy storage by using the mesoporous carbon composite in a battery (particularly the cathode of a lithium ion battery), capacitor, supercapacitor, or electric double layer capacitor (EDLC).

In one embodiment, at least one (or both, a portion, or all) of the electrodes of a CDI, EDLC, or lithium battery is constructed of the mesoporous carbon composite, except perhaps for the current collector. In another embodiment, the mesoporous carbon composite is in the form of a coating on a suitable base electrode material (or current collector). The base electrode material or current collector is often a conductive carbon material, such as graphite or carbon paper. In yet another embodiment, the mesoporous carbon composite is in the form of a layer covered by a layer of another porous material, such as a mesoporous carbon material, carbon foam, or porous graphite. In some embodiments, a titanium sheet current collector is used. In other embodiments, a composite material (e.g., activated carbon powder and a thermoplastic material, such as PTFE) is used as the base electrode or current collector.

In some embodiments, the mesoporous carbon composite described herein, without admixture with another carbon material, is used as the electrode or coated on a base electrode or current collector. In other embodiments, the mesoporous carbon composite described herein is admixed with one or more other carbon materials (e.g., activated carbon, another mesoporous carbon, a carbon foam, or a carbon aerogel). When admixing is desired, the porous carbon material is typically in a particulate form, such as a powder. The mesoporous carbon composite may also be admixed with a polymer, such as PVDF, or a conductive polymer.

In other aspects, the mesoporous carbon composite described herein are used as chromatography media, particularly for use in HPLC, and more particularly, for use in electrochemically modulated liquid chromatography (EMLC), as described, for example, in U.S. Pat. No. 7,449,165, the contents of which are incorporated herein by reference in their entirety.

Examples have been set forth below for the purpose of illustration and to describe certain specific embodiments of the invention. However, the scope of this invention is not to be in any way limited by the examples set forth herein.

Examples

Materials

Commercially available polyethylene glycol (PEG) with different average molecular weight: 1 kDa, 2 kDa, 4 kDa, and 8 kDa received from Fluka, along with 20 kDa and 14 kDa PEG and poly ethylene oxide of 100 kDa and 200 kDa received from Sigma-Aldrich, were all used as received. The carbon precursor was phloroglucinol (>99.0%, Aldrich) and formaldehyde (37 wt. % Sigma-aldrich). Ethanol, 190 proof (Decon Labs), and aqueous HCl (37 wt %, Sigma-Aldrich) were used without further purification.

Synthesis 2.3 g of phloroglucinol, 5.3 g of 1 kDa PEG was dissolved under intense stirring in 130 ml ethanol and 1 g HCl (37 wt. %) while heating to reflux. At reflux, 2.3 g of aqueous formaldehyde was added. The cloud point occurred within 3 min. after addition of formaldehyde. The reaction mixture was stirred for a total of 1.5 h, which resulted in solid masses. The ivory polymer solids were washed with ethanol and dried in an over at 80° C. overnight. Carbonization was carried out in a tube furnace under flowing Ar at a heating rate of 2° C./min to 850° C. and held for 2 h before cooling to ambient temperature.

Characterization Methods

Electron Microscopy.

Scanning electron microscopy (SEM) and transmission electron microscopy (TEM) images were obtained using a Hitachi HD 2000 STEM microscope at 200 kV. Samples for STEM were prepared by dispersion casting, where the sample was dispersed in ethanol with the grid and allowed to dry at ambient temperature before analysis.

$N_2$ Adsorption-Desorption.

Mesoporous sample measurements carried out at 77 K using a Micromeritics Tristar 3000 analyzer and microporous sample measurements on Quantachrome AS-1. Prior to measurement, samples were degassed at 170° C. under $N_2$ for at least 6 h. The specific surface area was calculated using the Brunauer-Emmitt-Teller (BET) method. The pore volume was estimated from single point adsorption at a relative pressure of 0.995. The average pore diameter was determined from the adsorption branch, according to the Barrett-Joyner Halanda (BHJ) method using Kruk-Jaroniec-Sayari (KJS) correction.

Small Angle X-Ray Scattering (SAXS).

SAXS data were collected with a Panalytical Empyrean diffractometer with Cu Kα radiation.

Preparation and Analysis of Mesoporous Carbon Composites

Figure 1B:
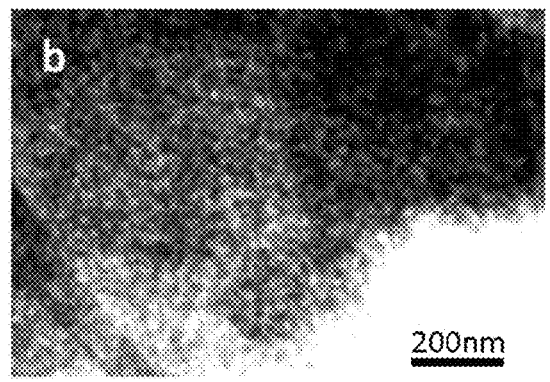
FIG. 1B. TEM image of mesoporous carbon from prepared PF-PEG (14 k MW) precursor.
Figure 2A:
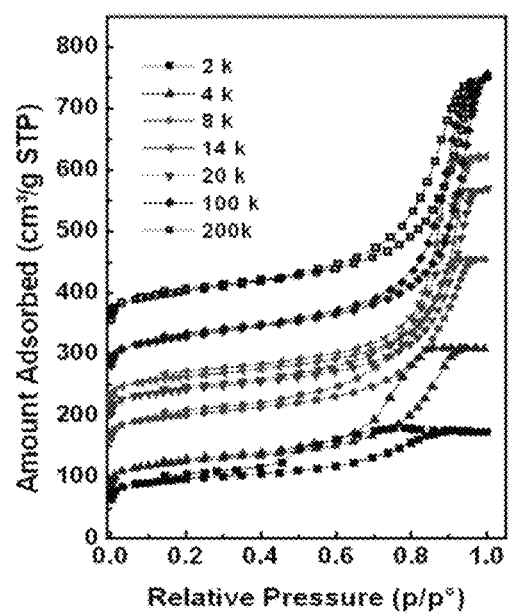
FIG. 2A. Nitrogen $-196°$ C. adsorption isotherms calculated using KJS method of carbon samples with respective PEG (in Da). For clarity, the isotherms were offset by consecutive increments of 50 $cm^3$ $g^{-1}$.
Figure 2B:
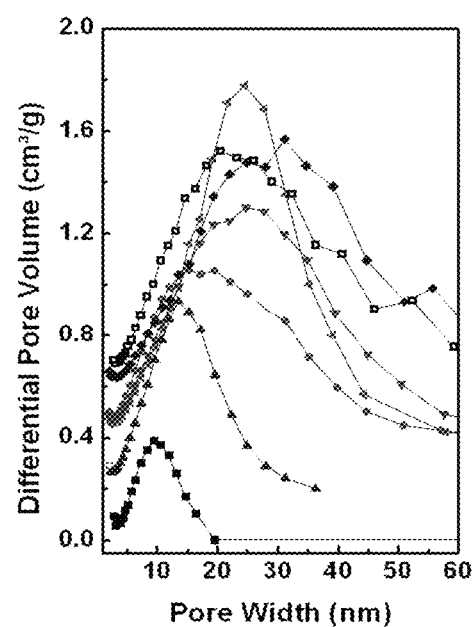
FIG. 2B. Pore size distributions calculated using KJS method of carbon samples with respective PEG (in Da). For clarity, the pore size distributions were offset in consecutive increments of 0.2 $cm^3$ $g^{-1}$.

In a typical run, phloroglucinol (P), formaldehyde (F), and PEG of various molecular weights, were mixed in ethanol under acidic conditions (as described above). Under refluxing conditions, PF-PEG aggregates were formed and precipitated. The PF-PEG solid was then dried and carbonized at 850° C. for 2 h under Ar atmosphere at a rate of 2° C./min. Under these conditions, the near complete degradation of all the molecular weights of the PEG used can be achieved, and the carbonization of the remaining PF at this temperature could yield a material optimal for conductivity testing. The mesoporosity of the resulting carbon material was confirmed via scanning electron microscopy (SEM) and transmission electron microscopy (TEM) (FIGS. 1A and 1B). The surface area of these materials was measured using nitrogen adsorption (FIGS. 2A and 2B). For clarity, the isotherms in FIG. 2A were offset by consecutive increments of 50 cm$^3$/g and pore size distributions offset in consecutive increments of 0.2 cm$^3$/g in FIG. 2B.

Figure 4:
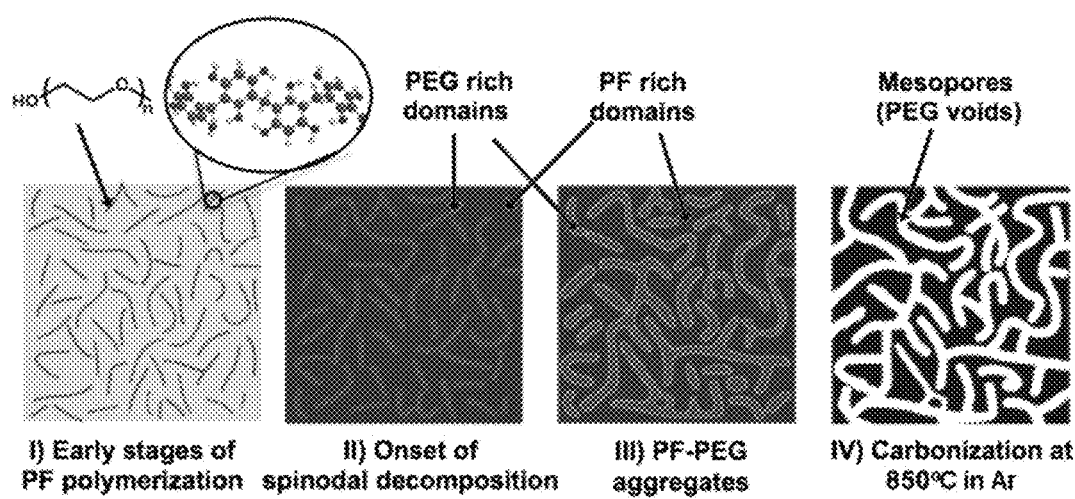
FIG. 4: Schematic illustration of spinodal decomposition (I to III) and subsequent formation of mesoporous carbon (IV) from PF-PEG adduct.

Without wishing to be bound by theory, it is believed a possible mechanism for the formation of mesoporosity under our conditions is summarized in FIG. 4:

FIG. 4 shows a schematic illustration of spinodal decomposition (I to III) and subsequent formation of mesoporous carbon (IV) from PF-PEG adduct.

Upon the addition of formaldehyde, acid catalyzed PF condensation polymerization occurs. As step-growth polymerization proceeds, the hydrophilic PF macromolecules undergo hydrogen-bonding interactions with the PEG polymers, leading to the formation of homogeneous PF-PEG aggregates, i.e., "polymer blend." As the PF molecular weight increases, microphase separation of the aforementioned homogeneous aggregates into the mesoscopic domains via spinodal decomposition is evidenced by the co-continuous structure found in FIGS. 1A and 1B but only microporosity in the PF sample without PEG addition. The PF polymerization "chemically quenches" the reaction in the spinodal region as the phase composition changes and new phase miscibility conditions are established for the newly formed polymer-polymer blend.

The acid is an essential component not only to the catalyzed polymerization of PF polymers but also to the interaction between the PF-PEG for driving the spinodal decomposition. The latter was evidenced by the formation of only microporous carbons from the samples prepared without acid. Acidic ethanol at increased temperature reduces polymer-polymer interactions, causing the end-to-end distance of the polymer chains to shrink. Eventually cluster formation becomes favorable as polymer chains collapse, leading to efficient spinodal decomposition.

The as-synthesized material is non-porous after drying and curing. The subsequent carbonization at 850° C. under inert Ar atmosphere destabilizes and decomposes the high oxygen containing PEG, revealing an inverse carbon replica. The mesoporosity is evident from the condensation step in the nitrogen adsorption isotherm with desorption hysteresis characteristic of the type IV isotherm in FIG. 2A.

Textural analysis was done using the Barrett, Joyner, and Halenda (BJH) method to calculate the pore size distributions according to the Kruk, Jaroniec, and Sayari (KJS) method, specific surface area was calculated using the Brunauer, Emmitt, and Teller (BET) method, and microsphere surface area and volume using the t-plot given in Tables 1 and 2.

TABLE 1

Nitrogen adsorption properties of mesoporous carbons by varying MW of PEG template

| PEG $M_w$ [Da] | $S_{BET}^a$ [m$^2$ g$^{-1}$] | $V_{total}$ [cm$^3$ g$^{-1}$] | $V_{meso}^b$ [cm$^3$ g$^{-1}$] | $D_{meso}^c$ [nm] |
|---|---|---|---|---|
| 2k | 360 | 0.197 | 0.098 (49.7) | 9 |
| 4k | 368 | 0.356 | 0.267 (75.0) | 14 |
| 8k | 372 | 0.480 | 0.395 (82.3) | 16 |
| 14k | 321 | 0.637 | 0.571 (89.6) | 25 |
| 20k | 368 | 0.374 | 0.285 (76.2) | 25 |
| 100k | 375 | 0.746 | 0.677 (91.2) | 31 |
| 200k | 375 | 0.629 | 0.558 (88.7) | 21 |

$^a$Specific surface area calculated using the BET equation in the relative pressure range of 0.05-0.20.
$^b$The numbers in parentheses are percentages of mesopore volume out of the total pore volume.
$^c$Average pore diameter found at maximum differential pore volume.

TABLE 2

Nitrogen adsorption properties of mesoporous carbons varying concentration PEG template.

| PEG Conc. [mM] | $S_{BET}^b$ [m$^2$ g$^{-1}$] | $S_{meso}^c$ [m$^2$ g$^{-1}$] | $V_{total}^d$ [cm$^3$ g$^{-1}$] | $V_{meso}^e$ [cm$^3$ g$^{-1}$] | $D_{meso}^f$ [nm] |
|---|---|---|---|---|---|
| 2.9 | 392 | 83 | 0.244 | 0.121 (49.6) | 19 |
| 1.4 | 321 | 164 | 0.546 | 0.481 (88.1) | 25 |
| 0.63 | 321 | 159 | 0.637 | 0.571 (89.6) | 16 |

$^a$ Phloroglucinol to 14 kDa PEG weight ratio.
$^b$ Specific surface area calculated using the BET equation in the relative pressure range of 0.05-0.20.
$^c$Mesoporous surface area.
$^d$External surface area.
$^e$The numbers in parentheses are percentages of mesopore volume out of total pore volume.
$^f$Average pore diameter found at maximum differential pore volume.

In comparison, carbon was produced at 850° C. using a similar procedure but with the triblock copolymer template, Pluronic F127 ($M_w$ 12.6 k Da, $PEO_{106}PPO_{70}PEO_{106}$), produced a similar micro- to mesopore ratio and pore volume but with an average pore size of 8.9 nm and a BET surface area of 518 m$^2$/g. Although the pore size distribution for PF-PEG (14 k Da) covers a much wider range of mesoporosity than that of Pluronic F127 templated PF resin, the adsorbed $N_2$ contribution from micropores is only 0.066 cm$^3$/g, compared to 0.12 cm$^3$/g, attributing nearly 90% of the pore volume to mesopores instead of 81%.

Under acidic ethanol reflux conditions, linear PEG chains agglomerate via spinodal decomposition in a similar fashion to the self-assembly of hydrophobic and hydrophilic blocks of Pluronic F127. In the Pluronic F127 templated carbon, the variation in mesopore size, pore size distribution discrepancies, and increased microporosity is due to self-assembly of micelles during the reflux and curing process. The hydrogen bonding between the PF resin and PEO corona yields high microporosity in the resulting carbon; in contrast, PF resin has a much stronger interaction with the exterior of the PEG because of the separate polymer phases.

As seen in Table 1, mesoporosity extends to the carbon produced using this method with a molecular weight range of 2 to 200 k Da PEG. Below 2 k Da PEG, no mesoporosity was observed and microporosity was nominal. At 2 k Da PEG, the desorption hysteresis closes at ~0.45 P/P$_0$, which is typically due to the cavitation in spherical pores. The small angle X-ray scattering (SAXS) patters of as-synthesized samples consist of one broad diffraction peak with q values of 0.092-0.17, and resolved features are not observed for higher reflections. This result suggests a worm-like mesopore dominated structure, which agrees well with the results observed from TEM images. When reviewing the pore size distribution from the carbon sample using the uppermost MW PEG, it is apparent that the broad pore size distribution is not a desirable characteristic for template materials; although, this still provides a reasonably large effective range. The observed results in FIG. 2B confirmed that by shifting the molecular weight from low to high, the average pore size increases. However, these values cannot be reflected in the BJH average pore size calculation, as this method is used for mesopores in the range of 2 to 50 nm. With the pore size distributions for the larger molecular weight PEG, the calculation is not valid as it reaches this limit, considering the values fall well into the macropore domain.

Figure 3A:
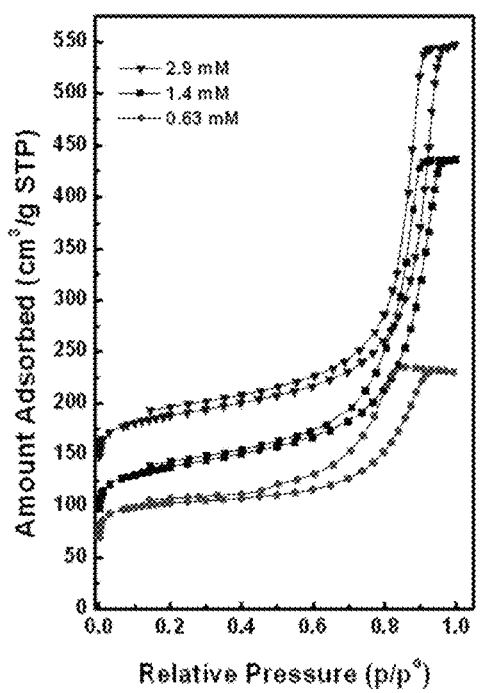
FIG. 3A. Nitrogen $-196°$ C. adsorption isotherms calculated using BJH method of carbon samples with respective PEG (MW=14 k Da). For clarity, the isotherms were offset by consecutive increments of 50 $cm^3$ $g^{-1}$.
Figure 3B:
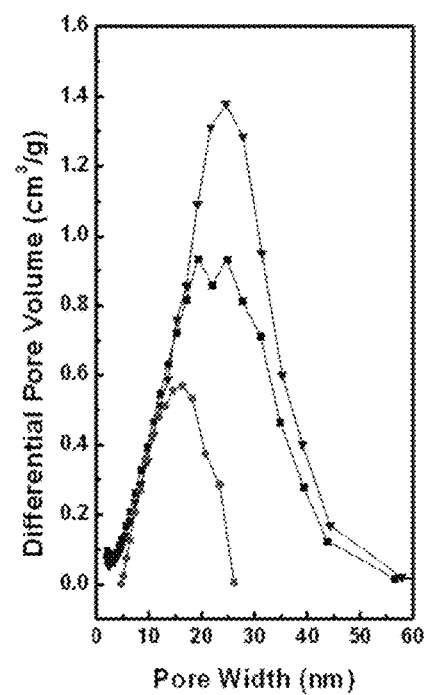
FIG. 3B. Pore size distributions calculated using KJS method of carbon samples with respective PEG (MW=14 k Da).

The mesopore volume can then be adjusted through the concentration of PEG in solution. This approach allows the mesopore volume of the resulting carbon to be either raised or lowered, as shown in FIGS. 3A and 3B, for a specific application. Reducing the concentration from 2.9 mM to 1.4 mM PEG results in a minimal shift in pore size indicating that the concentration determines the amount of the corresponding polymer phase. In contrast, when the amount of PEG is further reduced to 0.63 mM, the microporosity of the sample is doubled and mesoporosity is reduced by nearly 40% (Table 2). By the reversal in porosity, decreasing the concentration of PEG shifts the composition ratio towards the binodal into a metastable region. Consequently, there is less defined spinodal decomposition occurring and fractal clusters are formed that generate the mesopores and micropores, respectively.

In summary, using non surfactant linear PEG as a template for mesoporous carbon is reported. In contrast to prior soft templating approaches to mesoporous carbon, tailoring is limited only to the molecular weight selection available. This material shows improvement by reducing inherent microporosity while increasing pore size. By tuning the PF to PEG ratio, the mesopore volume can also be adjusted. These characteristics may be useful where mesoporosity is necessary for mass transport. Increased adsorption sites can be added using various means of activation to increase microporosity and add functionality. The ability to finely tune the mesoporosity of a carbon material through molecular weight and the concentration of PEG is relevant because of the novelty, particularly in comparison to traditional triblock copolymer templates where tuning would require more complex synthesis. This concept is especially important for industrial scale synthesis.

What is claimed is:

1. A method of fabricating a mesoporous carbon composite material, the method comprising providing a precursor composition and subjecting the precursor material to a curing step followed by carbonization step, the precursor composition comprising (i) a templating component comprised of a linear homopolymer material, wherein the linear homopolymer material is polyethylene oxide, (ii) a phenolic compound or material, (iii) a crosslinkable aldehyde component, and (iv) an acid catalyst, wherein a mesoporous carbon composite material is fabricated.

2. A method according to claim 1, wherein the polyethylene oxide has a molecular weight between 2,000 to 200,000 Da.

3. A method according to claim 1, wherein the phenolic compound or material is selected from the group consisting of phenol, catechol, resorcinol, dihydroquinone, phloroglucinol, cresols, halophenols, aminophenols, hydroxybenzoic acid, and dihydroxybiphenyls.

4. A method according to claim 1, wherein the crosslinkable aldehyde component is formaldehyde.

* * * * *